United States Patent
Porte

(10) Patent No.: US 6,328,258 B1
(45) Date of Patent: Dec. 11, 2001

(54) AIR INTAKE STRUCTURE FOR AIRCRAFT ENGINE

(75) Inventor: Alain Porte, Colomiers (FR)

(73) Assignee: Aerospatial Natra, Paris (FR)

( * ) Notice: Subject to any disclaimer, the term of this patent is extended or adjusted under 35 U.S.C. 154(b) by 0 days.

(21) Appl. No.: 09/461,177

(22) Filed: Dec. 14, 1999

(30) Foreign Application Priority Data

Dec. 21, 1998 (FR) .................................................. 98 16123

(51) Int. Cl.$^7$ ....................................................... B64B 1/24
(52) U.S. Cl. ........................ 244/53 B; 244/53 R; 244/62
(58) Field of Search ............................. 244/53 B, 53 R, 244/62; 137/15.1, 15.2; 60/270.1

(56) References Cited

U.S. PATENT DOCUMENTS

| | | | |
|---|---|---|---|
| H648 | * 7/1989 | Tran ........................................ | 244/134 |
| 4,749,150 | * 6/1988 | Rose et al. ........................... | 244/53 B |
| 4,759,513 | 7/1988 | Birbragher . | |
| 5,581,054 | * 12/1996 | Anderson et al. .................... | 181/213 |
| 5,743,488 | * 4/1998 | Rolston et al. ....................... | 244/53 B |
| 5,768,778 | * 6/1998 | Anderson et al. ................ | 29/888.01 |

FOREIGN PATENT DOCUMENTS 43 40 951   9/1994   (DE) .
 2698910   10/1994   (FR) .

* cited by examiner

Primary Examiner—Charles T. Jordan
Assistant Examiner—Kevin Jakel
(74) Attorney, Agent, or Firm—Burns Doane Swecker Mathis LLP

(57) ABSTRACT

In an air intake structure (14) of an aircraft engine pod, the link or connection between the air intake lip (15), the front reinforcing frame (16) and the acoustic panel (17) is implemented in such a way that the lip (15) can be dismantled without breaking the link between the frame (16) and the panel (17). Moreover, the internal, rear part (15a) of the lip (15) normally covers the front part (17a) of the panel (17), as well as the members (22, 24) ensuring the link between the latter and the frame (16).

13 Claims, 5 Drawing Sheets

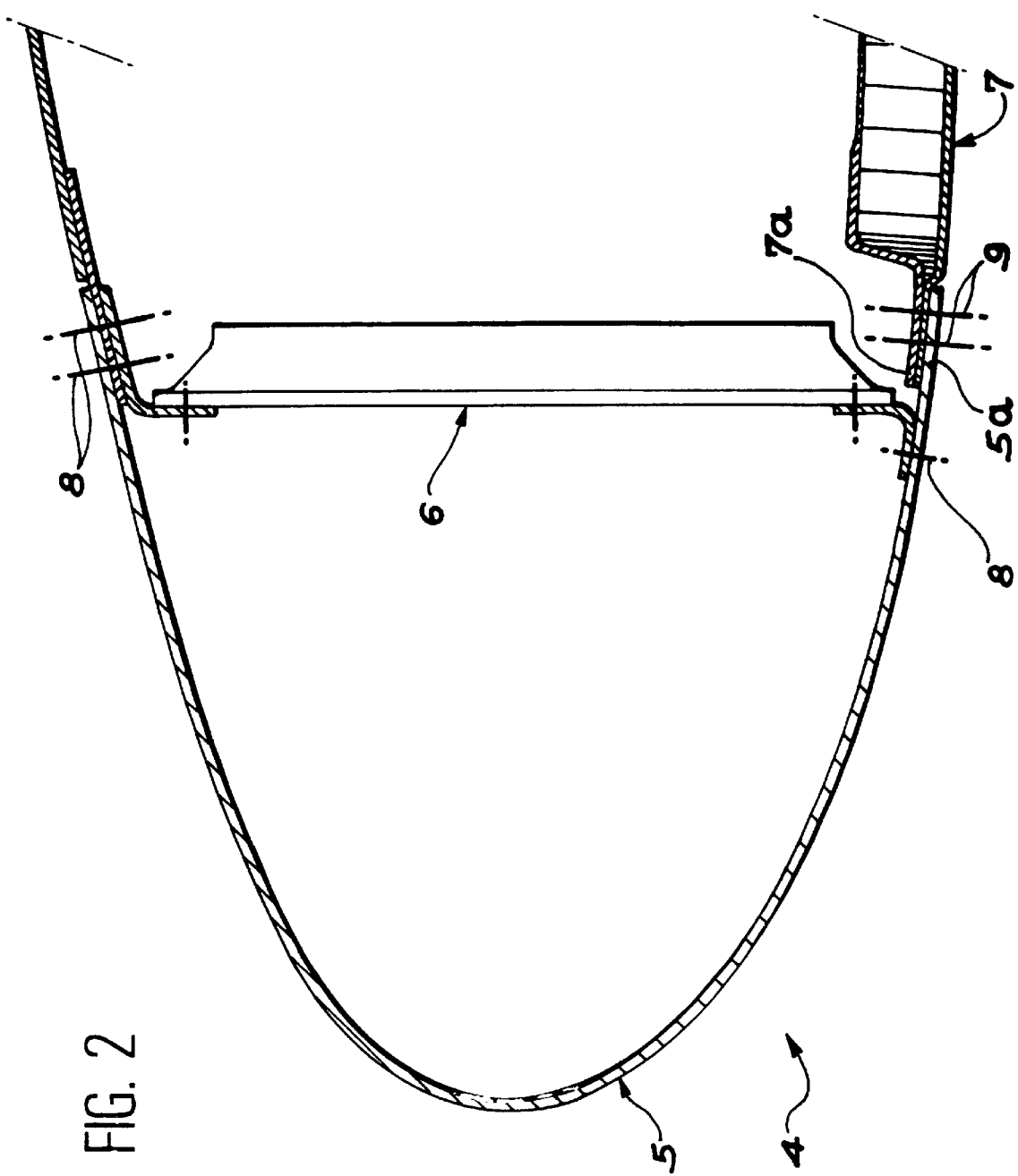

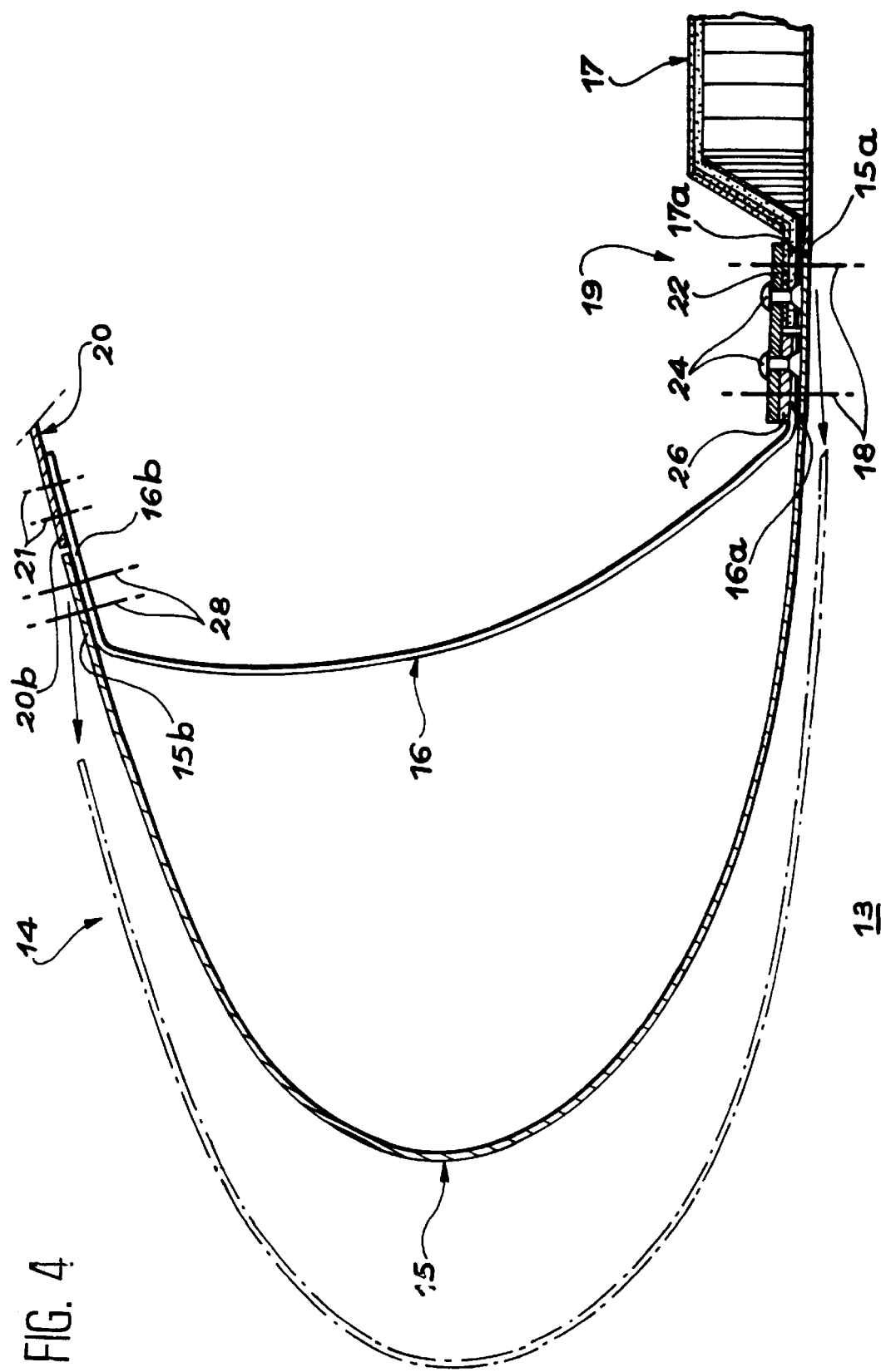

AIR INTAKE STRUCTURE FOR AIRCRAFT ENGINE

DESCRIPTION

1. TECHNICAL FIELD

The invention relates to an air intake structure usable on any type of aircraft engine or turbo-jet having an air intake.

In such a structure, the invention more specifically applies to the link between an air intake lip, a front reinforcing frame and an acoustic panel placed immediately behind the lip in the extension thereof.

By convention, the terms "front" and "rear" are used throughout the text using as the reference the front and rear of the engine.

Comparably, the terms "internal" and "external" are used throughout the text using for the reference the complete engine.

Conversely and still in accordance with convention, in the absence of a precision to the contrary, the terms "interior" and "exterior" are used to designated the position or orientation of parts with respect to the air intake structure considered in isolation.

2. PRIOR ART

As is very diagrammatically shown in perspective of FIG. 1, an aircraft engine comprises a central part 1 housing the actual engine and an annular part 2, called a pod, coaxially surrounding the central part of the engine and defining therewith an annular or fan duct 3. A fan, driven by the central part 1 of the engine, is placed at the inlet of the fan duct 3.

The front part of the pod 2 constitutes an air intake structure 4, whose function is in particular to ensure the aerodynamic flow of air on the one hand towards the fan duct 3 and on the other around the pod As shown in section and on a larger scale in FIG. 2, which illustrates a first known method for implementing the air intake structure 4, such a structure conventionally comprises on the side of the fan duct 3, an air intake lip 5, a front reinforcing frame 6 and an acoustic panel 7.

In cross-section, the air intake lip 5 is in the form of a rearwardly open U. It forms the external envelope of the front part of the air intake structure. It ensures the splitting of the air between the portion penetrating the fan duct and the portion flowing around the pod.

The front reinforcing frame 6 is placed in the interior and to the rear of the air intake lip 5. It ensures the mechanical strength of the front part of the pod and aids in maintaining shape and dimensioning. To this end, the front reinforcing frame 6 is fixed to the interior of the air intake lip 5, on the side of the fan duct and the outside of the engine, e.g. by means of rivets (illustrated by mixed lines 8).

The acoustic panel 7 forms the external envelope of the pod, to the rear of the air intake lip 5 and on the side of the fan duct 3. Said panel has a structure able to attenuate the noise produced by the central part of the engine and in particular the fan. In practice, this structure is normally of the composite, sandwich type, i.e. the panel 7 integrates a honeycomb core. In the known assembly method illustrated in FIG. 2, the front part 7a of the acoustic panel 7, which as no honeycomb core, is externally covered by the rear part 5a of the air intake lip 5 and fixed thereto by rivets (illustrated by mixed lines 9).

In view of its front position, the air intake lip 5 is exposed to damage and deterioration, which can in particular be due to erosion as a result of the air flow entering the engine, rain, hail, particles present in the atmosphere, etc. It can also be a question of accidental damage due to flight impacts (birds) or ground impacts, during the taxying phase (throwing up of pebbles) or during handling.

In order to ensure maintenance, it is clear that the air intake lip 5 of an aircraft engine must be frequently dismantled. In order to facilitate interventions, it is desirable for such a dismantling to be performable easily and rapidly. Therefore maximum importance is attached to the method used for assembling the air intake lip, the front reinforcing frame and the acoustic panel.

In the known assembly method illustrated by FIG. 2, the air intake lip 5 is fixed on the one hand to the front reinforcing frame 6 and on the other to the acoustic panel 7, without there being any link between frame and panel. Thus, on dismantling the air intake lip 5 by removing the rivets 8 and 9, there is no longer any connection between the front reinforcing frame 6 and the acoustic panel 7. Thus, the assembly loses all its rigidity, its dimensional references, etc.

To obviate this disadvantage, specific equipment and tools have been designed in order to restore from the outset a certain rigidity to the pod. However, the putting into place of such equipment, which surround the external structure of the air intake, causes heavy handling, which is very disadvantageous for the maintenance personnel. This also involves the equipment being present at the repair locations, which is also very disadvantageous.

FIG. 3 shows in section another known method for assembling the air intake lip 5, the front reinforcing frame 6 and the acoustic panel 7. In this case, the rear part 5a of the air intake lip 5 and the front part 7a of the acoustic panel 7 are placed end to end in an extension of one another. Each of these two parts is then fixed by rivets (respectively illustrated by mixed lines 8 and 9) on a rear part 6a of the front reinforcing frame 6, placed in the interior of parts 5a and 7a of lip 5 and panel 7.

When this method is used, the dismantling of the air intake lip 5 takes place by removing the rivets 8 and does not eliminate the link provided by the rivets 9 between the acoustic panel 7 and the front frame 6.

However, this method has the disadvantage of leaving uncovered the front end and leading edge of the acoustic panel 7 in the fan duct 3. This front end of the panel 7, as well as its leading edge, are consequently exposed to phenomena such as erosion, delamination, water introduction, etc. In view of the fact that the acoustic panel 7 is normally made from a composite material, this leads to a difficultly acceptable speeding up of damage to said panel.

DESCRIPTION OF THE INVENTION

The invention specifically relates to an air intake structure in which the link between the air intake lip, the front reinforcing frame and the acoustic panel is such that the disadvantages of the prior art methods are eliminated. In particular, the dismantling of the lip does not eliminate the link between the frame and the panel and the front end and leading edge of said panel are not exposed to the air flow in the fan duct.

According to the invention, this result is obtained by means of an air intake structure for an aircraft engine comprising:

an air intake lip with a rearwardly open U-shaped cross-section and having an internal, rear part, a front reinforcing frame installed in the air intake lip, an acoustic panel having a front part fixed to the front reinforcing frame by first fixing means in order to form a rigid assembly and second fixing means, independent of the first fixing means, for fixing the internal, rear part of the air intake lip to said rigid assembly, characterized in that the internal, rear part of the air intake lip covers the front part of the acoustic panel and the first fixing means.

In a first embodiment of the invention, the front part of the acoustic panel is placed in the extension of an internal, rear part of the reinforcing frame and the internal, rear part of the air intake lip is fixed on the one hand to the rear, internal part of the reinforcing frame and on the other hand to the front part of the acoustic panel by second fixing means.

In this case, the first fixing means advantageously comprise a plurality of linking or joining parts, which are circumferentially distributed about a longitudinal axis of the engine and overlap the rear, internal part of the front reinforcing frame and the front part of the acoustic panel within the structure. The first fixing means also comprise fixing members, such as rivets, linking the linking parts on the hand to the rear, internal part of the front reinforcing frame and on the other hand to the front part of the acoustic panel.

In order to compensate a possible thickness difference, shims, which are also traversed by the fixing members, can be placed between the linking parts and the rear, internal part of the front reinforcing frame.

Advantageously, the second fixing means then comprise other fixing members, linking the rear, internal part of the air intake lip on the one hand to the rear, internal part of the front reinforcing frame and on the other to the front part of the acoustic panel, at locations offset with respect to the linking parts.

According to a second embodiment of the invention, the front part of the acoustic panel is offset towards the interior of the structure, with respect to the rear, internal part of the front reinforcing frame. The first fixing means, such as rivets, then comprise at least one linking part, as well as fixing members linking said part on the one hand to the rear, internal part of the front reinforcing frame and on the other to the front part of the acoustic panel within the structure.

In this second embodiment of the invention, the front part of the acoustic panel can be substantially parallel to the rear, internal part of the front reinforcing frame. The first fixing means then comprise two linking parts in the form of rectangular, circular extrusions, whereof two contiguous flanges, oriented substantially radially with respect to the longitudinal axis of the engine, are fixed to one another and whereof the other flanges are respectively fixed to the rear, internal part of the front reinforcing frame and to the front part of the acoustic panel by the aforementioned fixing means.

The contiguous flanges of the two linking parts can both be oriented towards the interior of the structure. As a variant, they can also be oriented towards the interior of the structure for the part fixed to the rear, internal part of the front reinforcing frame and towards the exterior of the structure for the part fixed to the front part of the acoustic panel.

In the second embodiment of the invention, the front part of the acoustic panel can also be obliquely oriented so as to terminate in the vicinity of the trailing edge of the front reinforcing frame. The first fixing means then comprise a single linking part in the form of an open, circular extrusion, fixed on the one hand to the rear, internal part of the front reinforcing frame and on the other to the front part of the acoustic panel by linking means.

In the second embodiment of the invention, the second fixing means advantageously comprise other fixing members such as rivets linking the rear, internal part of the air intake lip to the rear, internal part of the front reinforcing frame, whilst traversing the linking part.

BRIEF DESCRIPTION OF THE DRAWINGS

Non-limitative embodiments of the invention will now be described in greater detail with reference to the attached drawings, wherein show:

FIG. 2, already described, a longitudinal sectional view showing a first known method for producing an air intake structure.

FIG. 4 a sectional view comparable to FIG. 2 showing an air intake structure according to a first embodiment of the invention.

DETAILED DESCRIPTION OF SEVERAL PREFERRED EMBODIMENTS OF THE INVENTION

Figure 1:
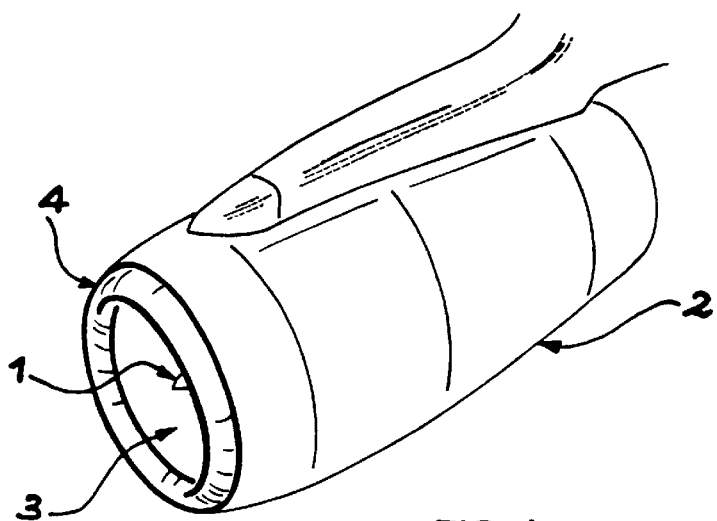
FIG. 1, already described, a perspective view of an aircraft engine.
Figure 3:
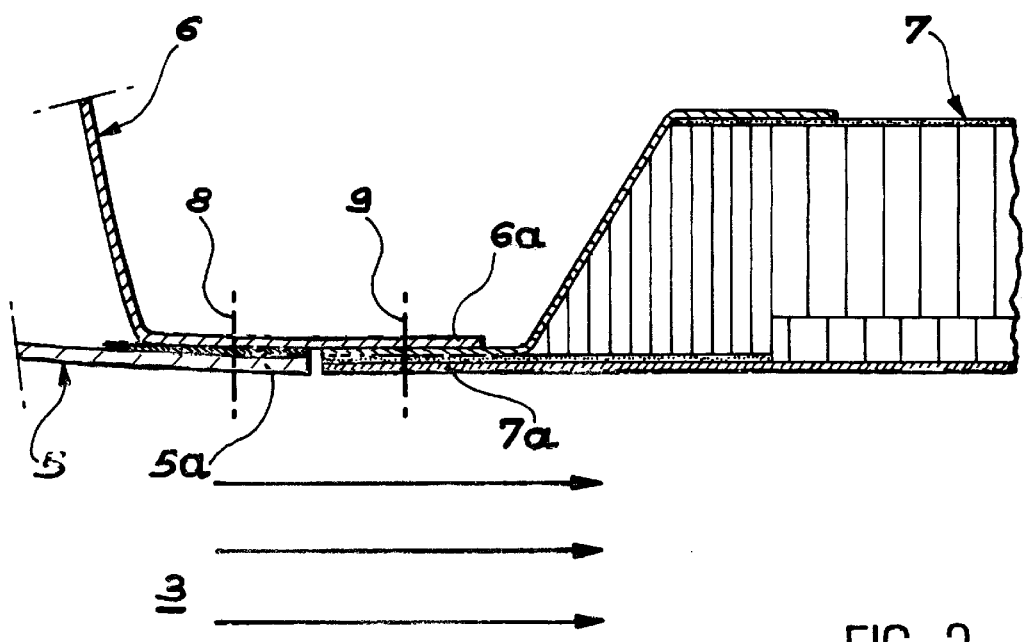
FIG. 3, already described, a longitudinal sectional view showing a second known method for producing an air intake structure.
Figure 5:
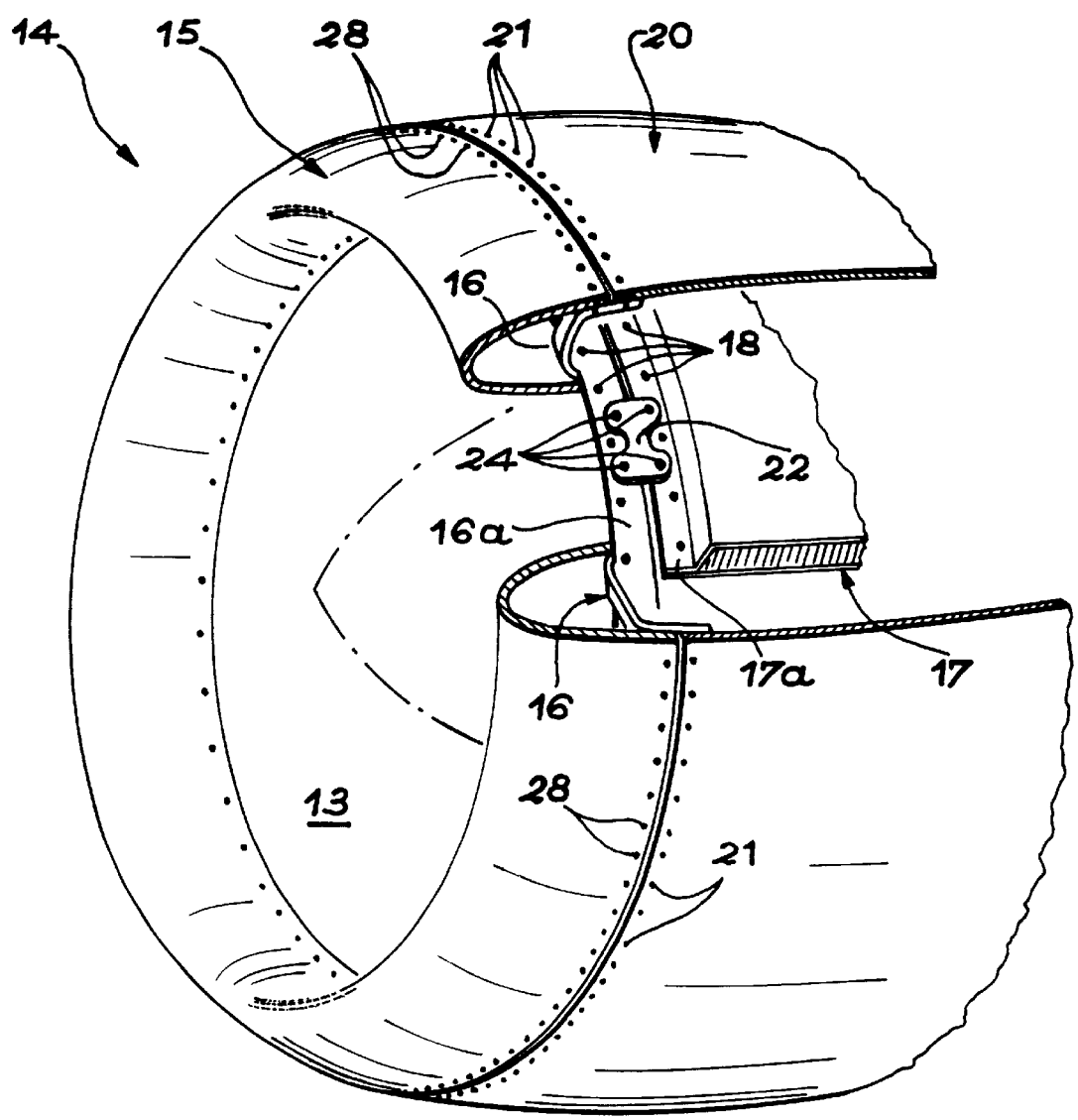
FIG. 5 a perspective view with partial tearing away illustrating the structure of FIG. 4.

FIGS. 4 and 5 illustrate a first embodiment of an air intake structure 14 for an aircraft engine in accordance with the present invention. In conventional manner, said structure 14 comprises an air intake lip 15, a front reinforcing frame 16 and an acoustic panel 17.

The air intake lip 15 has a U-shaped cross-section which is open towards the rear and forms the external envelope of the front part of the engine pod.

The front reinforcing frame 16 is installed in the interior and to the rear of the lip 15 and also roughly has a rearwardly open, U-shaped cross-section. It serves to ensure the rigidity and shape and dimensional maintenance of the front part of the pod.

Finally, the acoustic panel 17 forms the external envelope of the pod, on the side of the engine fan duct 13, to the rear of the air intake lip 15. It is made from a composite, sandwich material including a honeycomb core and internal and external skins. In the front part 17a of the panel 17, which does not have a honeycomb core, said skins are connected to one another.

On the external periphery of the pod, an external, rear part 16b of the front reinforcing frame 16 is fixed to the interior of a front part 20b of an external envelope 20, e.g. by means of rivets symbolized by the mixed lines 21. A rear, external part 15b of the air intake lip 15 is fixed to the rear, external part 16b, in the extension of part 20b, e.g. by means of rivets symbolized by the mixed lines 28.

On the internal periphery of the pod, around the fan duct 13, an internal, rear part 16a of the front reinforcing frame 16 is fixed to the front part 17a of the acoustic panel 17 by first fixing means 19, which can assume different forms, as will be shown hereinafter. Moreover, the rear, internal part 15a of the lip 15 is fixed at least to the rear, internal part 16a of frame 16 by second fixing means 18, independent of the first fixing means 19, and which will be described hereinafter. Moreover and in accordance with the invention, the rear, internal part 15a of the air intake lip 15 covers both the rear part 16a of the frame 16, the front part 17a of the panel 17 and the first fixing means 19. Due to this arrangement and as is shown in mixed line form in FIG. 4, the removal of the second fixing means 18 and rivets 28 makes it possible to dismantle the air intake lip 15 without eliminating the link between the frame 16 and the panel 17, ensured by the first fixing means 19. Thus, the frame 16 and panel 17 form an assembly which remains rigid following the dismantling of the second fixing means 18. Moreover, the arrangement is such that the front part 17a of the acoustic panel 17 is completely covered by the rear part 15a of the air intake lip 15. This prevents any accelerated damage risk for the acoustic panel 17.

In the first embodiment illustrated in FIGS. 4 and 5, the front part 17a of the acoustic panel 17 is placed in the extension of the rear, internal part 16a of the front reinforcing frame 16.

In this case, the first fixing means 19 comprise a plurality of linking parts 22, as well as fixing members, such as rivets 24, linking the parts 22 on the one hand to the rear, internal part 16a of the frame 16 and on the other to the front part 17a of the panel 17.

As is more specifically illustrated by FIG. 5, the parts 22 are approximately H-shaped parts, which are regularly distributed over the entire circumference of the structure around the longitudinal axis of the engine. More specifically, the parts 22 overlap the parts 16a and 17a towards the interior of the air intake structure, so that the central branch of the H is positioned along the junction line between these two parts. Each part 22 is then fixed by two rivets 24 to the rear, internal part 16a of the frame 16 and by two other rivets 24 to the front part 17a of the acoustic panel 17.

To take account of the fact that the front part 17a of the acoustic panel 17 is generally thicker than the rear, internal part 16a of the front reinforcing panel 16, preferably a shim 26 (FIG. 4) is placed between part 16a and each of the parts 22.

As is more particularly illustrated in FIG. 4, the rivets 24 traverse the parts 22, as well as part 16a or part 17a. More specifically, the rivets 24 have milled heads, housed in hollowed out portions machined in parts 16a and 17a towards the exterior of the structure. This arrangement makes it possible to completely house the rivet heads in recesses. In other words, the rivet heads are flush with the surfaces of parts 16a and 17a turned towards the exterior of the structure.

Moreover, the rear, internal part 15a of lip 15 covers parts 16a and 17a, as well as the heads of rivets 24. The second fixing means by which said part 15a is fixed to parts 16a and 17a are then constituted by fixing members such as rivets 18 (illustrated by mixed lines in FIG. 4). Certain of these rivets 18 fix the lip 15 to the frame 16 whilst traversing parts 15a and 16a thereof at locations offset with respect to the parts 22 and as is more particularly illustrated in FIG. 5. Other rivets 18 traverse part 15a of lip 15, as well as part 17a of panel 17 at locations which are also offset with respect to parts 22.

It is therefore possible to dismantle the air intake lip 15 by removing the rivets 18 and 28 without there being any risk of eliminating the link ensured between the frame 16 and acoustic panel 17 by the second fixing means 19. Thus, the rivets 24 are masked by the lip 15. Therefore the maintenance personnel cannot inadvertently pierce them when the air intake lip is removed.

Figure 6A:
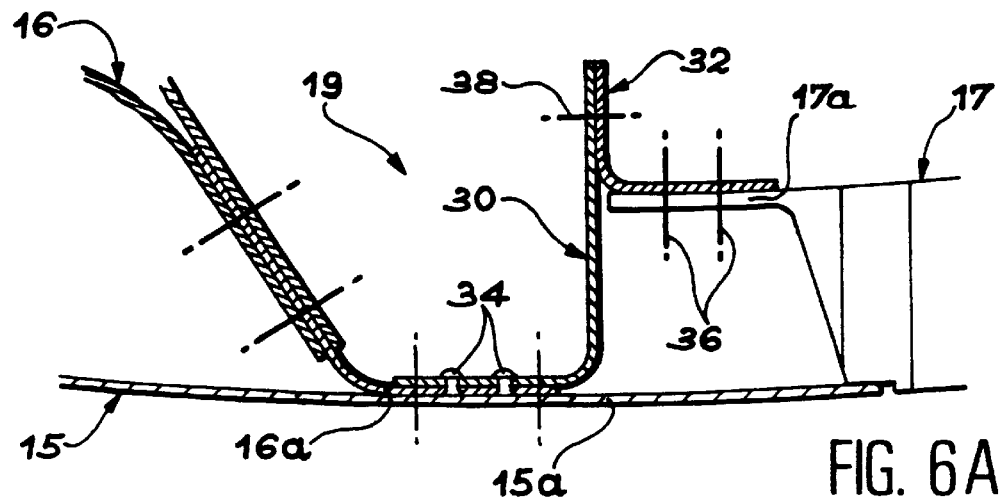
FIGS. 6A, 6B & 6C longitudinal sectional views comparable to FIG. 3 illustrating three variants of a second embodiment of the invention.
Figure 6B:
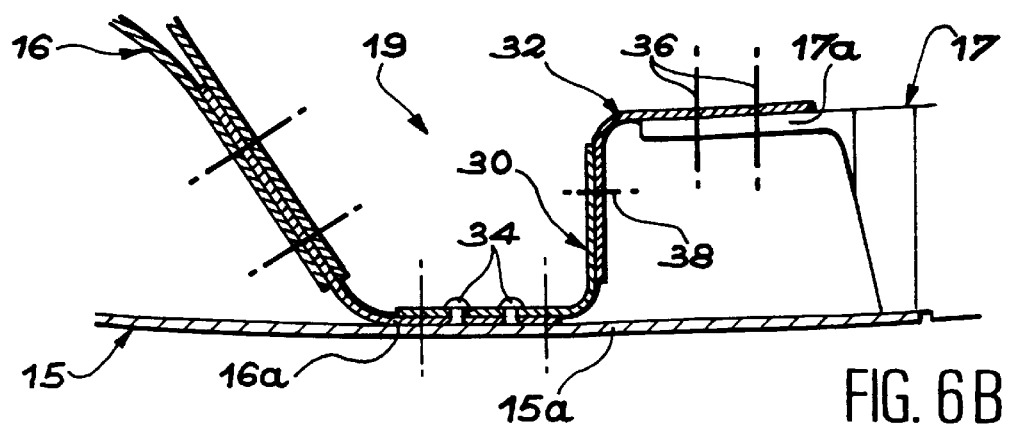
Figure 6C:
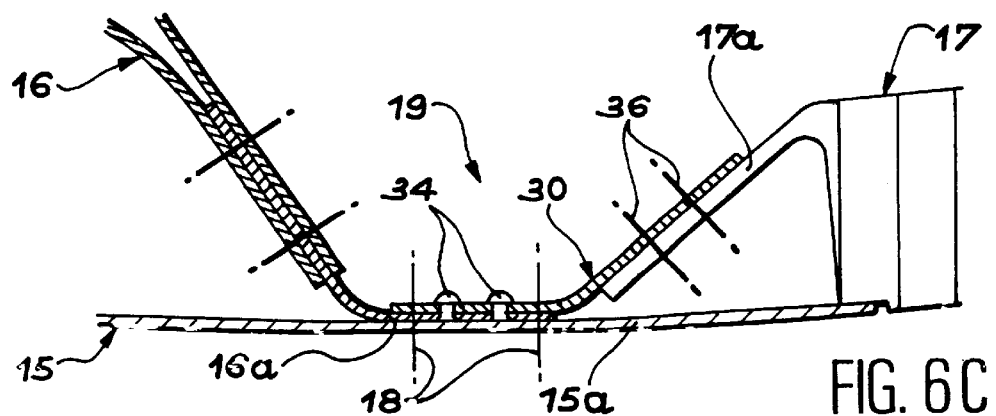

With reference to FIGS. 6A, 6B and 6C a description will now be given of three variants of a second embodiment of the invention.

This second embodiment of the invention essentially differs from the first by the fact that instead of being placed in the extension of the rear, internal part 16a of the frame 16, the front part 17a of the acoustic panel 17 is displaced towards the interior of the structure with respect to said part 16a.

More specifically, in the variants of FIGS. 6A and 6B, the front part 17a of the acoustic panel 17 is oriented substantially parallel to the rear, internal part 16a of the front reinforcing frame 16. Under these conditions, the first fixing means 19 linking the frame 16 to the panel 17 comprise two linking parts 30 and 32, both having the shape of a rectangular, circular extrusion.

In these two variants, a first cylindrical flange of the linking part 30 is fixed to the interior of the rear, internal part 16a of the frame 16 by fixing members such as rivets 34 and a first cylindrical flange of the linking part 32 is fixed to the interior of the front part 17a of the panel 17 by fixing members such as rivets (illustrated by the mixed lines 36).

In the variant of FIG. 6A, the second flanges of linking parts 30, 32 both extend radially towards the interior of the structure and are fixed to one another by fixing members such as rivets (illustrated by mixed lines 38).

In the variant of FIG. 6B, the second flange of the linking part 30 extends radially towards the interior of the structure and the second flange of the linking part 32 extends radially towards the exterior of the structure. These two flanges are also fixed to one another by fixing members such as rivets (illustrated by the mixed lines 38).

In the variant illustrated in FIG. 6C, the front part 17a of the acoustic panel 17 is oriented obliquely, so that its leading edge terminates in the vicinity of the internal, trailing edge of the rear part 16a of frame 16.

Under these conditions, the first fixing means 19 linking the frame 16 to the panel 17 comprise a single linking part 30 in the form of an open, circular extrusion. A first cylindrical flange of said linking part is fixed in the interior of the rear, internal part 16a of frame 16 by fixing members such as rivets 34 and the second flange of the linking part 30 is fixed in the interior of the front part 17a of panel 17 by fixing members such as rivets (illustrated by mixed lines 36).

In the three variants of the second embodiment of the invention described hereinbefore with reference to FIGS. 6A to 6C, the second fixing means 18 comprise fixing members such as rivets, which traverse the parts 15a and 16a. As a function of the particular case, these rivets 18 can also traverse the corresponding flange of part 30 or can be placed level with not shown windows provided for this purpose in said flange.

The heads of the rivets 34 are also housed in hollows machined in the internal face of part 16a, so as to be flush with said face, as in the previously described first embodiment.

The rear, internal part 15a of the air intake lip 15 is also extended towards the rear, so as to ensure the continuity with the surface of the acoustical panel 17 turned towards the fan duct, whilst integrally covering the front part 17a of panel 17, as well as the first fixing means 19.

As in the first embodiment of the invention, this arrangement makes it possible to reserve the integrity of the link between frame 16 and panel 17 when lip 15 is dismantled, whilst ensuring the protection of the front part 17a of panel 17 when the lip 15 is in place. This arrangement also avoids any risk of an accidental dismantling of the link between frame 16 and panel 17 during the removal of lip 15, because the first fixing means 19 connecting the frame and panel are entirely covered by the rear, internal part 15a of lip 15.

Obviously, the invention is not limited to the embodiments described in exemplified manner hereinbefore. Thus, the forms and shapes given to the front reinforcing frame 16, to the front part 17a of acoustic panel 17 and to the parts for linking these two structural elements can undergo various modifications without passing outside the scope of the invention. In addition, the parts 22 can be fixed to the frame 16 at a location displaced towards the front and towards the interior of the air intake structure. Moreover, instead of being used in one piece, the air intake lip can comprise a rear, internal part divided up into two sections respectively surrounding the rear, internal part of frame 16 and the front part of panel 17 and fixed thereto.

What is claimed is:

1. Air intake structure for an aircraft engine comprising:
   an air intake lip with a rearwardly open U-shaped cross-section and having an internal, rear part;
   a front reinforcing frame installed in the air intake lip;
   an acoustic panel having a front part fixed to the front reinforcing frame by a first fixing means in order to form a rigid assembly;
   a second fixing means, independent of the first fixing means, for fixing the internal, rear part of the air intake lip to said rigid assembly; and
   wherein the internal, rear part of the air intake lip covers the front part of the acoustic panel and the first fixing means.

2. Air intake structure according to claim 1, wherein the front part of the acoustic panel is placed in the extension of a rear, internal part of the front reinforcing frame and the rear, internal part of the air intake lip is fixed on the one hand to the rear, internal part of the reinforcing frame and on the other to the front part of the acoustic panel by the second fixing means.

3. Air intake structure according to claim 1, wherein the front part of the acoustic panel is displaced towards the interior of the structure, with respect to a rear, internal part of the front reinforcing frame, and the first fixing means comprise at least one linking part and fixing members linking said part on the one hand to the rear, internal part of the front reinforcing frame and on the other to the front part of the acoustic panel in the interior of the structure.

4. Air intake structure according to claim 3, wherein the front part of the acoustic panel is obliquely oriented and terminates in the vicinity of a trailing edge of the front reinforcing frame and the first fixing means comprise a single linking part in the form of an open, circular extrusion, fixed on the one hand to the rear, internal part of the front reinforcing frame and on the other to the front part of the acoustic panel by linking members.

5. Air intake structure according to claim 4, wherein the second fixing means comprise other fixing members linking the rear, internal part of the air intake lip to the rear, internal part of the front reinforcing frame.

6. Air intake structure according to claim 3, wherein the second fixing means comprise other fixing members linking the rear, internal part of the air intake lip to the rear, internal part of the front reinforcing frame.

7. Air intake structure for an aircraft engine comprising:
   an air intake lip with a rearwardly open U-shaped cross-section and having an internal, rear part;
   a front reinforcing frame installed in the air intake lip;
   an acoustic panel having a front part fixed to the front reinforcing frame by a first fixing means in order to form a rigid assembly;
   a second fixing means, independent of the first fixing means, for fixing the internal, rear part of the air intake lip to said rigid assembly;
   wherein the internal, rear part of the air intake lip covers the front part of the acoustic panel and the first fixing means; and
   wherein the first fixing means comprise a plurality of linking parts, circumferentially distributed about a longitudinal axis of the engine and overlapping the rear, internal part of the front reinforcing frame and the front part of the acoustic panel within said structure, and fixing members linking the linking parts on the one hand to the rear, internal part of the front reinforcing frame and on the other to the front part of the acoustic panel.

8. Air intake structure according to claim 7, wherein shims, also traversed by the fixing members, are placed between the linking parts and the rear, internal part of the front reinforcing frame.

9. Air intake structure according to claim 8, wherein the second fixing means comprise other fixing members, linking the rear, internal part of the air intake lip on the one hand to the rear, internal part of the front reinforcing frame and on the other to the front part of the acoustic panel, at locations offset with respect to the linking parts.

10. Air intake structure according claim 7, wherein the second fixing means comprise other fixing members, linking the rear, internal part of the air intake lip on the one hand to the rear, internal part of the front reinforcing frame and on the other to the front part of the acoustic panel, at locations offset with respect to the linking parts.

11. Air intake structure for an aircraft engine comprising:
    an air intake lip with a rearwardly open U-shaped cross-section and having an internal, rear part;
    a front reinforcing frame installed in the air intake lip;
    an acoustic panel having a front part fixed to the front reinforcing frame by a first fixing means in order to form a rigid assembly;
    a second fixing means, independent of the first fixing means, for fixing the internal, rear part of the air intake lip to said rigid assembly;
    wherein the front part of the acoustic panel is displaced towards the interior of the structure, with respect to a rear, internal part of the front reinforcing frame, and the first fixing means comprise at least one linking part and fixing members linking said part on the one hand to the rear, internal part of the front reinforcing frame and on the other to the front part of the acoustic panel in the interior of the structure; and
    wherein the front part of the acoustic panel is substantially parallel to the rear, internal part of the reinforcing frame and the second fixing means comprise two linking parts in the form of rectangular, circular extrusions, whereof two contiguous flanges, oriented substantially radially with respect to a longitudinal axis of the engine, are fixed to one another and whereof the two other flanges are respectively fixed to the rear, internal part of the front reinforcing frame and to the front part of the acoustic panel by fixing members.

12. Air intake structure according to claim 11, wherein the contiguous flanges of the two linking parts are oriented towards the interior of the structure.

13. Air intake structure according to claim 11, wherein the contiguous flanges of the linking part fixed to the rear, internal part of the front reinforcing frame and the linking part fixed to the front part of the acoustic panel are oriented respectively towards the interior and the exterior of the structure.

* * * * *